O. F. ORNDOFF.
FURROW OPENING ATTACHMENT.
APPLICATION FILED MAR. 9, 1908.
914,450.
Patented Mar. 9, 1909.
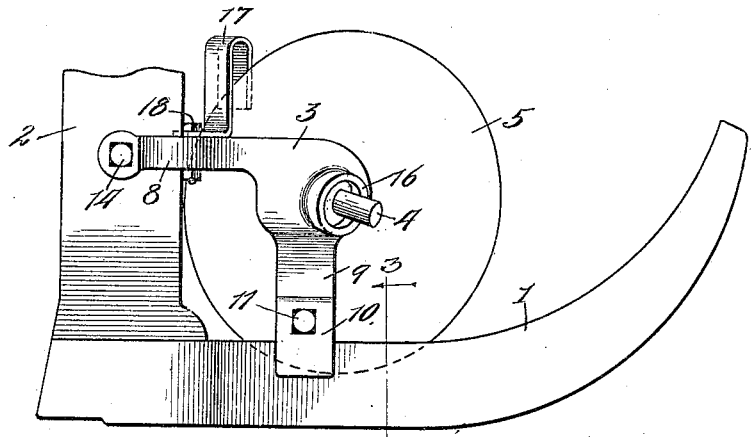
Fig. 1.
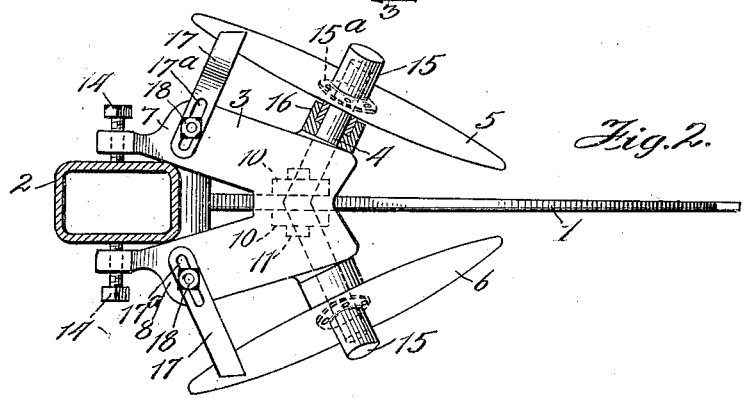
Fig. 2.
Fig. 3.
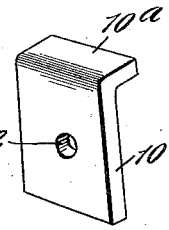
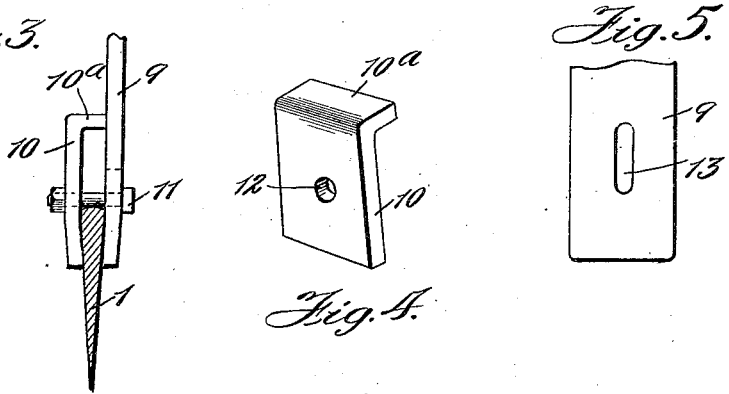
Fig. 4.
Fig. 5.
Witnesses:
Inventor:
O. F. Orndoff
By Brown & Hopkins
Attys.

UNITED STATES PATENT OFFICE.

OSCAR F. ORNDOFF, OF HARVEYS, PENNSYLVANIA.

FURROW-OPENING ATTACHMENT.

No. 914,450.

Specification of Letters Patent.

Patented March 9, 1909.

Application filed March 9, 1908. Serial No. 419,845.

*To all whom it may concern:*

Be it known that I, OSCAR F. ORNDOFF, a citizen of the United States, residing at Harveys, in the county of Greene and State of Pennsylvania, have invented certain new and useful Improvements in Furrow-Opener Attachments, of which the following is a full, clear, and exact specification.

The invention relates to furrow-opener attachments adapted for use on corn planters and other seeding machines and is particularly adapted for use on that class of planters and seeders provided with shoes of a colter-like formation adapted to open up the soil, and having a seed tube formed in conjunction therewith to deliver the seed into the opening formed by the shoe which precedes the point of delivery of the seed to the shoe.

Furrow-opening devices of the class to which the present invention belongs are used in conjunction with planters and the like of the character stated, for the purpose of opening up a furrow of more or less depth according to the manner in which the planter is adjusted and thereby enabling the shoe and the seed tube of the seeder to perform their customary function of depositing the seed in the ground, but at a much greater depth with respect to the surrounding earth since it is desirable to plant the seed at the bottom of the furrow or at a greater depth below the surface of the surrounding soil than the ordinary depth to which the seed is inserted in the ground, without at the same time increasing the amount of earth immediately over the seed.

The present invention is applicable to devices of the class described provided with one or more rotating disks, usually two of such disks, one supported on each side of the shoe and so positioned as to throw the earth outwardly from the shoe as the shoe advances.

The primary object of the present invention is to provide an improved device of the character described that is simple, cheap and efficient and at the same time enables the device to be readily attached to common forms of planters or seeders of the class described.

A further object of the invention is to provide an improved device of the class described in which the means for supporting the axle which carries the disks and means for attaching the same to the seed tube and shoe of the planter or seeder is of a simpler and more efficient form than heretofore used, and as it employs a much less number of parts, being composed chiefly of a single casting, it is therefore not only stronger and more durable in character but is at the same time more economical to make in that there is less labor and machine work necessary in fitting of parts in its manufacture.

To the attainment of these ends and the accomplishment of other new and useful objects, as will appear, the invention consists in the features of novelty described in the specification, pointed out more particularly in the appended claims and illustrated in the accompanying drawings, forming a part of the specification.

In the said drawings, Figure 1 is a view in side elevation of the device showing the same attached to the seed tube and shoe of the common form of planter or seeder. In this view one of the disks is removed to disclose the details of the construction of the parts embodying the invention. Fig. 2 is a plan view of the device as it appears in Fig. 1 but showing both the disks in position. Fig. 3 is a detail sectional view on line 3—3 of Fig. 1, showing the manner of attaching the device to the shoe. Figs. 4 and 5 are detail views of parts appearing in Fig. 3.

The shoe of an ordinary form of planter is indicated by the reference character 1. 2 is the seed tube. The seed tube is shown rectangular in cross section, which is a common form used on planters of the class described, although it is common to construct these tubes of other forms, as for example, nearly round in cross section or oval. 3 is an irregular shaped member carrying the axle 4 on which the disks 5 and 6 are journaled for rotation. The axle member 4 is preferably constructed of one continuous piece, of the form illustrated in Figs. 1 and 2. It is preferably given the form illustrated and secured in the main body of member 3 by being cast therein at the time the member 3 is cast, although it will be apparent that it may be secured to the member in any other suitable manner. The member 3 is provided with 2 spaced rearwardly extending branches 7 and 8 which have their opposing or inner surfaces formed to converge inwardly towards the center of the member in the manner illustrated in Fig. 2, so that the adjacent faces of the branches will engage the face of the tube thus enabling these branches to find a position of rest when placed in position on the seed tube whatever may be the size or diameter of the tube and as the branches are of some thickness they will have extended upright bearings against the tube. This feature is very desirable since these attachments are designed for use on all styles of planters and the sizes of the various seed tubes of the same vary considerably in different planters. Member 3 is preferably provided with an integral depending branch 9 which extends to the shoe, and for securing this branch to the shoe the clamping member 10 is provided and the same is secured to the branch 9 by any suitable means, as, for example, the threaded bolt 11 passing through hole 12 in the member 10 and through the vertically elongated slot 13 in the depending branch 9. The slot 13 permits the vertical adjustment of the supporting member 3 which is accomplished by sliding the V-shaped bearing of the rearwardly extending branches along the forward vertical surface of the seed tube. The shoe 1 is usually formed wedge-shaped in cross section, being wider at the top than at any other part, as illustrated in Fig. 3, so that when it receives the branch 9 and the clamping member 10, as illustrated in Fig. 3, and the parts are tightened, the disk supporting member 3 will be held firmly in relation to the shoe 1 and prevent it from moving upwardly in relation to the shoe. The clamping member 10 is provided with a flange 10ª adapted to bear against the branch 9 and serve as a fulcrum in clamping the parts together. The work required to be done in furrow-openers of the character to which the invention is shown applied causes the strains imparted to the supporting member by the disks to be in the upward and rearward directions. The V-shaped socket formed between branches 7 and 8 is therefore admirably adapted to take the rearward strains of the device since it finds its seat against the seed tube.

The branches 7 and 8 of the supporting member may be provided near their rearward extremities with set screws 14 which, when tightened against the lateral walls of the seed tube, may serve as an additional means for securing the supporting member to the seed tube. These set screws may be dispensed with, if desired, in the exemplification of the invention as shown since the means of attachment of the supporting member to the shoe and the support afforded between the member and the seed tube by reason of the V-shaped socket affords ample means for holding the device in the desired relation with the shoe and the seed tube.

The disks 5 and 6 are of the usual or any desired construction and may be secured and held in position on the axle member 4 in any desired manner. In the form illustrated in the drawings, 15 is a hub or thimble provided with flange 15ª by which the disk is secured in position by riveting or in any other suitable manner, the ends of the axle 4 projecting beyond the supporting member 3 enter the hub 15. The inner ends of the hub 15 project beyond the disks to provide a suitable inner bearing which they find by coming into contact with suitable thimble washers 16. These washers 16 are preferably removable in order that they may be removed when worn and either replaced or any lost motion taken up by inserting suitable washers over the axle between the washers 16 and the member 3. The disks are held in position on the ends of the axle by means of scrapers 17 which are preferably secured by being bolted to the top surface of branches 7 and 8 of the main supporting member 3 by bolts 18. The scrapers are of the usual form, extending upwardly over the rim of the disk and thence downwardly and bearing against a portion of the exterior surface adjacent its cutting edge. They are preferably provided with longitudinal slots 17ª, by which they may be adjustably secured by bolting to branches 7 and 8. It will be seen that in holding the disks in position these scrapers are only called upon to prevent their being pulled off the axles when the device is not in operation in a normal manner, since there is no tendency for the disks to work off the axles as the thrust is all in the direction tending to force them against the thimble washers on the inner ends of the axles.

It will be apparent that by use of the construction described an exceedingly simple device is provided and one which at the same time has great strength in proportion to the amount of metal required. Also by reason of the fact that the parts or branches by which the axle supporting member is attached to the shoe and seed pipe, are formed integral or of a single casting, there is little liability of the device getting out of adjustment.

In order that the invention might be fully understood by those skilled in the art, the details of the foregoing embodiment thereof have been thus specifically described but

What I claim as new therein and desire to secure by Letters Patent is—

1. The combination with a seed tube and shoe of a planter, of a furrow opener comprising a disk, a member to which the disk is journaled, said member having engagement with the seed tube, means for securing the member to the tube, and means for securing said member to the shoe embodying a branch formed integral with said member and a member adjustable on the branch and forming a clamp therewith.

2. The combination with a seed tube and shoe of a planter, of a furrow-opener comprising a disk, a member to which the disk is journaled, said member having a bearing against the seed tube, means for securing the member to the tube, and means for securing said member to the shoe embodying a depending branch formed integral with said member, and clamping means carried by the branch and adjustable longitudinally with respect to the branch.

3. The combination with a seed tube and shoe of a planter, of a furrow-opener comprising a disk, a member carrying an axle for the disk, means for securing said member to the seed tube comprising a pair of spaced branches formed integral with said member, a scraper adapted to coöperate with said disk, and means for attaching the scraper to one of the integral branches on the side of the seed tube adjacent the disk.

4. The combination with a seed tube and shoe of a planter, of a furrow-opener comprising a pair of disks, a member provided with axles for carrying said disks, means for securing said member to the seed tube comprising a pair of spaced branches formed integral with said member and adapted to receive the seed tube therebetween, means for securing the member to the shoe, and a pair of scrapers carried by the said spaced branches.

5. The combination with a seed tube and shoe of a planter, of a furrow-opener comprising a disk, a member carrying an axle for the disk, means for securing said member to the seed tube comprising a pair of spaced branches formed integral with said member, said spaced branches being provided with their adjacent faces diverging outwardly toward their extremities whereby seed tubes of varying diameters may be wedged into position between said diverging surfaces on the spaced branches, and means for securing the disk carrying member to the shoe.

6. The combination with a seed tube and shoe of a planter, of a furrow-opener comprising a disk, a member provided with an axle for the disk, said member comprising an integral piece provided with a V-shaped socket adapted to furnish a bearing on the seed tube, and a clamp for securing the said integral piece to the shoe.

7. In combination, a seed tube, a disk, and a supporting member for the disk, said member having a bifurcated portion provided with converging faces, said bifurcated portion being adapted to stand astride of the tube with the converging faces directly engaging the tube.

8. In combination, a seed tube, a disk, a supporting member for the disk, said member having a bifurcated portion provided with converging faces, said bifurcated portion being adapted to stand astride of the seed tube with the said converging faces directly engaging the tube, and means for securing said member against displacement.

9. In combination, a seed tube, a disk, a supporting member to which the disk is journaled, said member having a bifurcated portion provided with converging faces between which faces the seed tube projects, each of said faces having an extended upright bearing directly against the tube, and means for securing the said member to the tube.

10. In combination, a seed tube, a disk, a supporting member to which the disk is journaled, said member having a bifurcated portion provided with converging faces between which faces the seed tube projects, each of said faces having an extended upright bearing directly against the tube, and means passing through the walls of the said bifurcated portion beyond their points of contact with the tube for securing the member in position.

11. The combination with a seed tube, and shoe of a planter, of a furrow opener comprising a pair of disks, a member to which the disks are journaled, means for securing said member to the seed tube comprising a pair of spaced branches formed integral with said member and adapted to receive the tube therebetween, said branches having direct bearings against the tube, means for securing the member to the shoe, and a pair of scrapers carried by the said spaced branches.

12. In combination, a seed tube, a disk, a supporting member to which the disk is journaled, said member having spaced branches, the adjacent faces of the branches converging inwardly and between which the seed tube projects, said faces having bearings against the tube, means for securing the member to the tube, a scraper for the disk, and means for attaching the scraper to the said member.

In testimony whereof I have signed my name to this specification, in the presence of two subscribing witnesses, on this 5th day of March A. D. 1908.

OSCAR F. ORNDOFF.

Witnesses:
B. H. ORNDOFF,
M. W. CANTWELL.